United States Patent [19]

LeBlanc et al.

[11] Patent Number: 4,611,095
[45] Date of Patent: Sep. 9, 1986

[54] TELEPHONE CONFERENCE BRIDGE SYSTEM

[75] Inventors: Vincent G. LeBlanc; Allan B. Cameron, both of Saint John, Canada

[73] Assignee: The New Brunswick Telephone Company Limited, St. John, Canada

[21] Appl. No.: 512,128

[22] Filed: Jul. 8, 1983

[30] Foreign Application Priority Data

Oct. 25, 1982 [CA] Canada ................................. 414136

[51] Int. Cl.⁴ ............................................ H04M 3/56
[52] U.S. Cl. ........................ 179/18 BC; 179/18 AB
[58] Field of Search ............ 179/18 BC, 99 A, 99 M, 179/99 R, 18 DA, 18 AB

[56] References Cited

U.S. PATENT DOCUMENTS

| | | | |
|---|---|---|---|
| 3,912,874 | 10/1975 | Botterell et al. | 179/18 BC |
| 3,971,899 | 7/1976 | McIntosh | 179/99 A |
| 4,086,438 | 4/1978 | Kahn et al. | 179/18 BE |
| 4,150,259 | 4/1979 | Fenton et al. | 179/18 BC |
| 4,203,001 | 5/1980 | Condon | 178/3 |
| 4,317,961 | 3/1982 | Johnson | 179/18 BC |
| 4,424,418 | 1/1984 | Moore et al. | 179/18 BC |
| 4,479,195 | 10/1984 | Herr et al. | 364/900 |

FOREIGN PATENT DOCUMENTS

791228 7/1968 Canada .
1093194 1/1981 Canada .

*Primary Examiner*—Thomas W. Brown
*Attorney, Agent, or Firm*—Wenderoth, Lind & Ponack

[57] ABSTRACT

A telephone conference bridge system comprising line interface circuits, bridge circuits, a tone transmitter/receiver and a microcomputer. The system is controlled by the microcomputer and can provide changeable levels of security such as (1) all ports open to receive incoming calls, (2) access only upon dialing a two-digit code and (3) all unused ports closed after a conference is established. Tone codes can also be used to activate a port occupancy detection system or to disconnect all callers from the bridge. One port is a "Chairman's Port" which is the only one able to make outgoing calls from the bridge or change the programming of security levels and codes, excepting that any TouchTone set on any port can implement security level (3) above with or without the chairman's port occupied.

4 Claims, 3 Drawing Figures

TELEPHONE CONFERENCE BRIDGE SYSTEM

BACKGROUND OF THE INVENTION

This invention relates to a telephone conference bridge system.

A conference bridge is a device which allows several telephone lines to be bridged together to establish a telephone conference with negligible effect on transmission. Each line connection to the bridge is known as a port.

Telephone conferencing systems are known in the art. For example, Canadian Pat. No. 1,093,194 of Fenton et al, issued Jan. 6, 1981, discloses a communication system call conference control arrangement using a stored program control. The system uses a microprocessor and is capable of conference calls and provides various status indications by means of LED's. The stations use a telephone having a plurality of special buttons in addition to the normal dialing buttons. In the patent such a telephone is termed a multibutton electronic telephone (MET) set and each set has 6 wires, namely 2 "data-in" wires, 2 "data-out" wires and the usual T and R wires. Adding or subtracting a party requires pushing a special +/− button and then a button associated with the line to be added or subtracted.

The conference bridge system according to the present invention utilizes ordinary Touch Tone (trade mark) telephones and is simpler than the system of Canadian Pat. No. 1,093,194; it does not, however, provide the same features as the system described in the patent.

Canadian Pat. No. 791,228 of Gaunt, Jr., issued July 30, 1968, discloses telephone conferencing circuits employing a series of stages arranged in a loop. Each stage includes an amplifying element, e.g. a transistor. The arrangement provides an adequate signal transmission level between the various lines and at the same time prevents regenerative circulation of signals. The patent is concerned with bridge circuits per se and does not disclose a complete system including microcomputer control such as used by the present invention.

SUMMARY OF THE INVENTION

The conference bridge system according to the invention provides the following capabilities:

(1) Outgoing calls can be made from the bridge system by using a Touch Tone set, from the chairman's port.
(2) Incoming calls can be answered and transferred directly to the conference bridge system or, as selected by the user, only upon receipt of a two-digit Touch Tone security code.
(3) The ability to remotely change the access security code via a Touch Tone telephone set.
(4) Lock out or open ports by using a two-digit Touch Tone code.
(5) Initiate a line scan and give back an audible tone for each line in use. A line scan is initiated by a two-digit Touch Tone code.
(6) Place an audible tone on the bridge when a line is allowed access.
(7) Drop all lines from the bridge in response to a two-digit Touch Tone code.

The preferred embodiment according to the invention uses two five-port bridges, a microcomputer and associated hardware. The two five-port bridges are tied together to allow ten lines to be bridged with low loss transmission. The microcomputer and associated hardware provide an operating system and line control.

A single five-port bridge may be used, in which case five lines may be bridged together.

Actually the bridges each have a sixth port, as will be described, but this sixth port is not directly connected to a telephone line and is thus not an available "port"; thus each bridge is, in effect, a five-port bridge.

The bridge system according to the invention is accessed by subscribers dialing a regular seven-digit number, after which their call will be switched to an available port of the conference bridge by the local switching office (equivalent number service). Dialing a single seven-digit number accesses the bridge even though there are 4 (or 9) lines, one associated with each ordinary port of the bridge. The local switching office will switch the first incoming call to the first port, the second call to the second port, etc. The chairman's port has its own telephone number. Outgoing calls can also be made from a "Chairman's Port" to any available "normal" port to bring people into the conference.

The bridge system has three changeable levels of security:

(1) All ports open to receive incoming calls.
(2) All ports open, but access to the conference requires dialing an additional two-digit security code from a Touch Tone telephone set.
(3) Close or open all unused ports after the conference is established.

Other security features available to any Touch Tone sets on the conference are:

(1) A "Port Occupancy Detection System" which will give a single beep to all conference participants for each occupied port after an activate code is dialed.
(2) An ability to disconnect all callers from the bridge.

Calls to the bridge system according to the invention are processed as follows:

Security 1: Automatically answered and connected to the conference.
Security 2: Automatically answered but not connected to the conference until a two-digit security code is dialed.
Security 3: Ring no answer, for calls made after the bridge is closed.

The bridge system is programmed to perform security levels 1 and 2 of security by any person with a Touch Tone telephone set. A special security code has to be dialed in order to make changes.

The system has a number of normal ports (e.g. 4 or 9), and one special port, the "Chairman's Port". The "Chairman's Port" must be used for some programming and control functions. This port should have a separate telephone number for controlled access to the bridge system.

Features controlled by the Chairman's Port are:
(1) Programming of security levels and codes.
(2) Making of outgoing calls.

Prior art bridges known to the present inventors have only the ability to:
(1) Answer calls automatically.
(2) Lock out unused ports with single digit Touch Tone signalling.
(3) Disconnect all ports with single digit Touch Tone signalling.
(4) Provide zero dB loss port to port.

Thus, in accordance with a broad aspect of the invention, there is provided a telephone conference bridge system for interconnecting a plurality of telephone lines in a conference connection comprising a line interface circuit connected between said telephone lines and a conference bridge circuit, a tone transmitter/receiver connected to said line interface circuit, and a computer connected to said line interface circuit and said tone transmitter/receiver, said line interface circuit having means for detection of an incoming call and, via said tone transmitter/receiver, indicating said detection to said computer, said computer storing information regarding the busy/idle status of said telephone lines and controlling means in said interface circuit for connecting the incoming call to the bridge circuit.

The computer is preferably a microcomputer.

Figure 1:
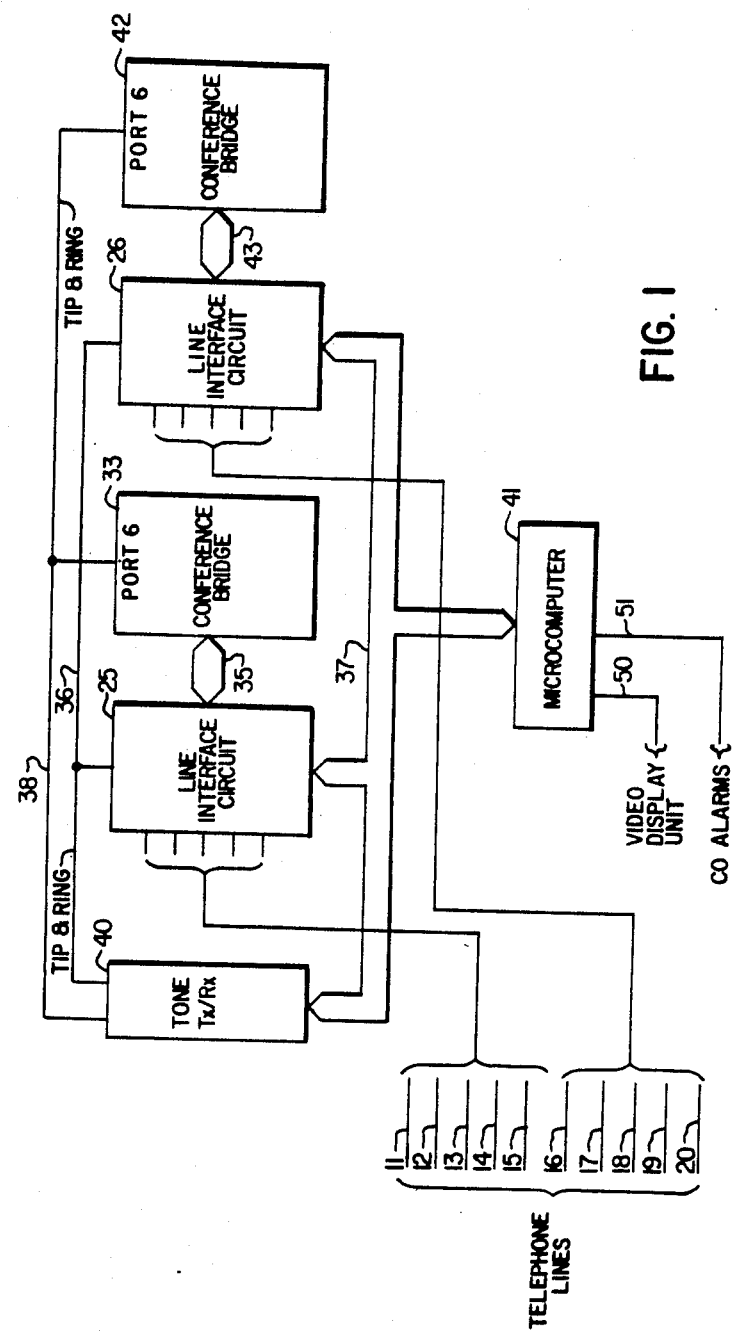
FIG. 1 is a block diagram of a ten port conference bridge system according to the invention.

A five port conference bridge system is composed of FIG. 1 less interface card 26 and bridge card 42.

DESCRIPTION OF THE PREFERRED EMBODIMENTS

Referring to FIG. 1 there is shown a block diagram of a telephone conference bridge system according to the invention which allows up to ten telephone lines to be bridged together with low transmission loss between lines. Five telephone lines 11-15 are connected to a line interface circuit 25 and five others, 16-20, are connected to line interface circuit 26, for a total of ten telephone lines. Line interface circuit 25 is connected to conference bridge 33 by a bus 35, to tone transmitter/receiver 40 by a line (tip and ring) 36 and to microcomputer 41 by a bus 37. Line interface circuit 26 is connected to conference bridge 42 by a bus 43 and to microcomputer 41 by the bus 37.

Figure 2:
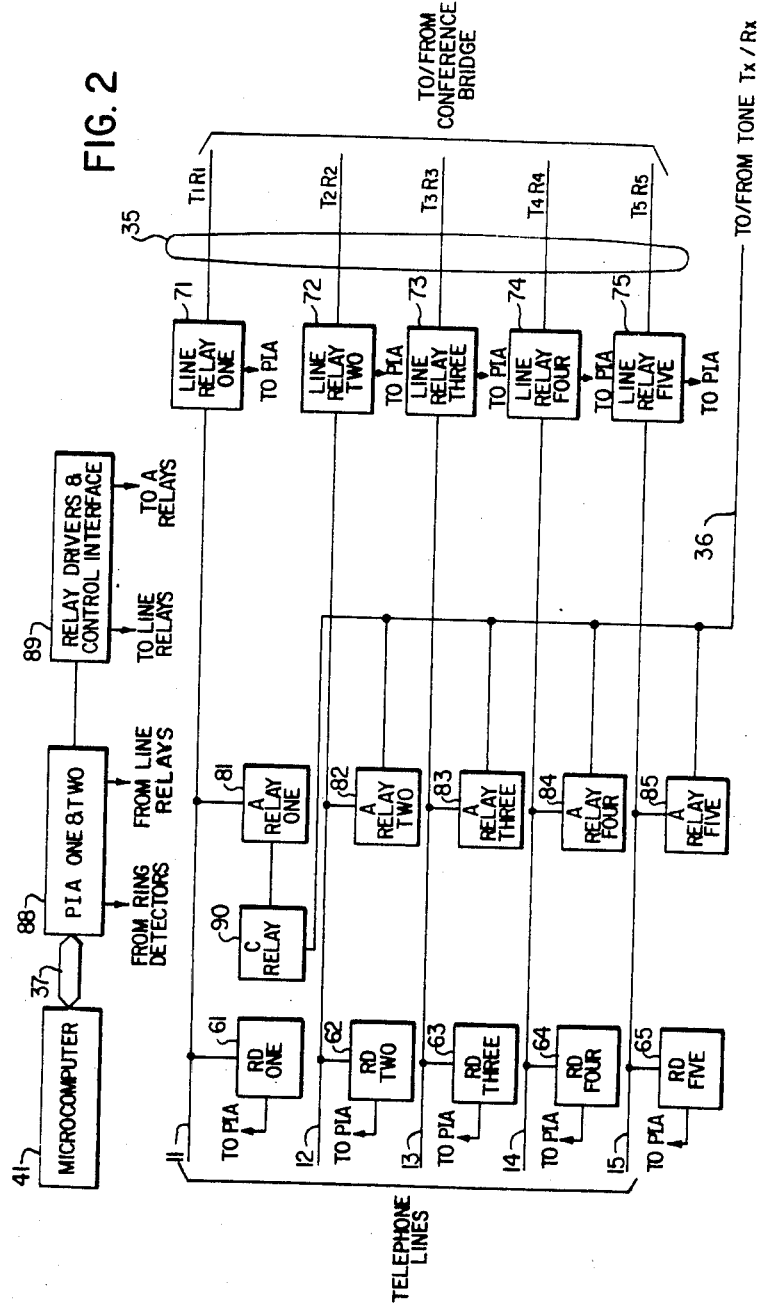
FIG. 2 is a block diagram of a line interface circuit used in the system according to the invention.

FIG. 2 is a block diagram of a five line interface card, e.g. card 25 of FIG. 1. Each of the incoming lines 11-15 is provided with a ring detector 61-65. The ring detectors 61-65 actuate line relays 71-75 to connect lines 11-15 to the conference bridge 33 (FIG. 1) via bus 35. Any of lines 11-15 can be interconnected for low loss transmission by conference bridge 33 and any of lines 16-20 can be interconnected by conference bridge 42. Connections between lines of the first group (11-15) and second group (16-20) require both conference bridges 33 and 42. The conference bridges 33 and 42 each have a sixth port and these are interconnected by line 38, leaving five ports of each bridge available for incoming lines.

The ring detectors 61-65 also operate A relays 81-85 to switch an incoming line to the tone Tx/Rx circuitry 40 (FIG. 1) via line 36 and connect the Chairman's line, line 11 in this example, to an unused line when making an outgoing call. All connections are under control of the microcomputer 41 via bus 37. Thus, an incoming call on an idle line results in the associated ring detector sending a signal to the microcomputer 41 via PIA (peripheral interface adapter) 88 and bus 37. The microcomputer stores in memory an indication that the line has been seized and, via bus 37 and PIA 88, operates the relay drivers and control interface 89 which then operates the associated A relay and line relay to connect the caller to the conference bridge.

In the use of the Chairman's Line, line 11, activation of A relay 81 also results in activation of C relay 90, which enables the chairman to make outgoing calls on one of the other lines 12-20.

PIA 88 (FIG. 2) connects via bus 37 to the microcomputer 41. The PIA 88 switches the data presented to it from the microcomputer and drives relay drivers 89. It also receives data from the ring detectors 61-65 and line relays 71-75 and places it on the data bus 37 under the control of the microcomputer.

The relay drivers 89 interface the PIA 88 and the relays 71-75, 81-85 and 90.

Figure 3:
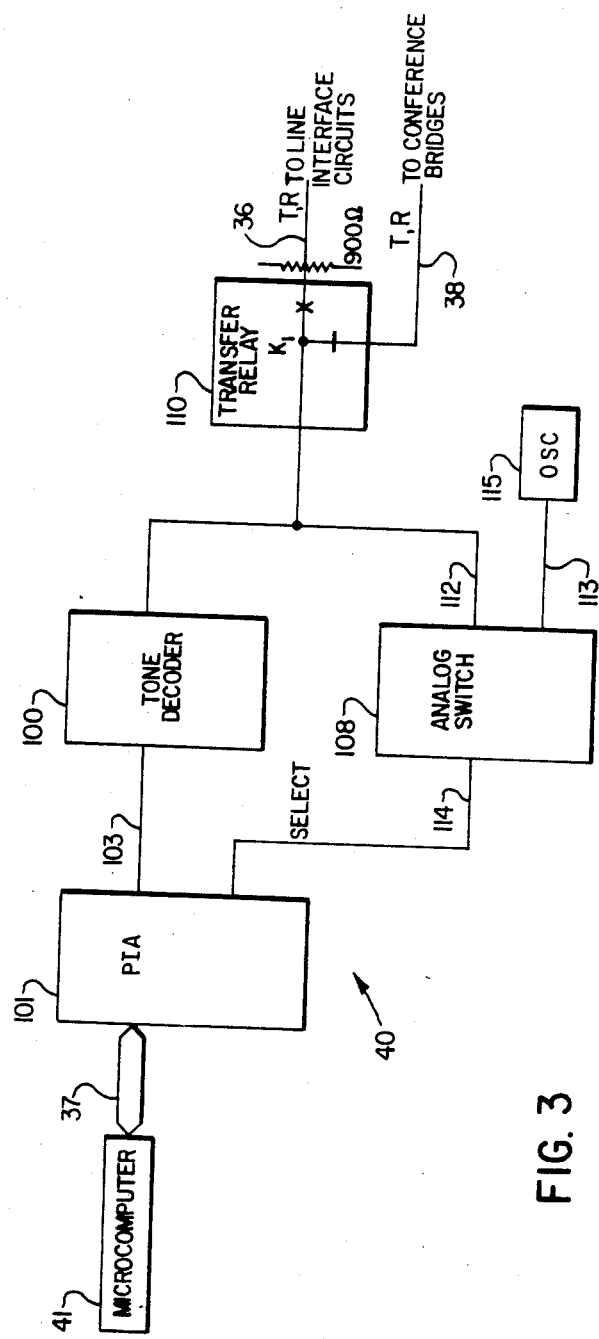
FIG. 3 is a block diagram of a tone transmit/receive (Tx/Rx) circuit used in the system according to the invention.

Referring to FIG. 3, the tone Tx/Rx circuit board is connected to the line interface circuits 25 and 26 (FIG. 1) via line 36 upon operation of transfer relay 110. Touch Tone signalling on line 36 is converted into binary code by a tone decoder 100. The binary code is then sent out to the microcomputer over bus 103, PIA 101 and bus 37. When a tone burst is to be placed on the conference bridge system, eg. when programmed for Security 2, discussed below, the Tx/Rx circuit is addressed by the microcomputer 41 to cause the transfer relay 110 to disconnect line 36 and connect a tone transmitter to the conference bridges 33 and 42 via line 38. The tone transmitter may comprise a switch 108 having an input 113, an output 112 and a select input (enable) 114. The microcomputer 41 enables input 114 via PIA 101, whereby a tone generated by oscillator 115 may be passed from input 113 to output 112 and thence to the bridges 33 and 42 via transfer relay 110 and line 38.

The microcomputer can be programmed for various security levels by calling the Chairman's Port, which should have its own telephone number, and dialing appropriate codes with a twelve button Touch Tone telephone. These codes are sent over bus 37 by the tone Tx/Rx circuit 40 to the microcomputer 41. Assuming port 11 is a Chairman's Port, ports 12-20 are available as conference ports.

Assuming that the microcomputer has been programmed for Security 1, an incoming call on any available port 12-20 will be automatically connected to the conference. If programmed for Security 2, the call is answered but not immediately connected to the conference. Instead, the microcomputer 41 enables the tone generator in the tone Tx/Rx circuit 40, via bus 37, to send two tone bursts to the caller via line 38. This is a signal to the calling party to input a two-digit Security Code within six seconds. If the proper code is then entered by the caller, it is converted to binary data form by the Tx/Rx circuit 40 which sends it to the microcomputer 41 over bus 37. The microcomputer 41 then enables the appropriate relays in interface circuit 25 or 26, over bus 37, to connect the calling party to the conference.

For Security 3, (bridge closed) microcomputer 41 causes ring no answer to be returned to the calling party by the tone Tx/Rx 40.

The five port system differs from the FIG. 1 embodiment in that it has only interface circuit 25, in this case a five line interface circuit and only one conference bridge circuit 33. This system functions in the same manner as the FIG. 1 embodiment and need not be further described.

The tone receiver (decoder) 100 may be, for example, a MITEL MH 88210 Hybrid DTMF Receiver System.

The PIA 88 may be a Motorola MC 6821.

The relay drivers and control interface 89 may comprise MOC 3021 relay drivers.

The ring detectors may be Monsanto MCT6 opto-isolators.

Lines 36 and 38 comprise tip and ring leads while buses 35 and 43 comprise 5 pairs of tip and ring leads. Bus 37 comprises two PIA select leads, a clock lead, a R/W lead, two address leads and 8 data leads.

The conference bridges 33 and 42 may be capacitor coupled Wescom 4140-00 2 wire/6 way bridges.

The microcomputer 41 may comprise a Rockwell R6502-13 microprocessor, 4 MHz crystal, TMS 2114 NL 1024 word by 4 bit RAM, National Semiconductor MM 2716 16,384 bit (2048×8 bit) uv erasable PROMS, reset switch, alarm cut off key and alarm status indicators.

As shown in FIG. 1, the microcomputer 41 may include connections 50 and 51 to a video display unit and CO (central office) alarms.

Obviously the system could use other types of computer, e.g. a minicomputer, but a microcomputer is more cost effective.

What we claim as our invention is:

1. A telephone conference bridge system for interconnecting a plurality of telephone lines in a conference connection comprising a line interface circuit connected between said telephone lines and a conference bridge circuit, a tone transmitter/receiver connected to said line interface circuit, and a computer connected to said line interface circuit and said tone transmitter/receiver, said line interface circuit having means for detection of incoming calls on said lines and, via said tone transmitter/receiver, indicating each said detection to said computer, said computer storing information regarding the busy/idle status of said telephone lines and controlling relay means in said interface circuit for connecting each line having an incoming call to the bridge circuit, said relay means being driven by relay drivers actuated by the computer via a peripheral interface adapter, wherein an incoming call on a line is detected by a ring detector in the line interface circuit, said ring detector sending a signal to the computer via a peripheral interface adapter to indicate the existence of the incoming call, said computer causing the tone transmitter/receiver to send tone signals to an incoming caller and only connecting the caller to the bridge system upon receipt of a predetermined reply sequence of tones, one of said lines being designated a "Chairman's Port" and said interface circuit having means whereby only the Chairman's Port can make outgoing calls from the bridge system by connecting said one of said lines to another one of said lines, a predetermined tone code via the Chairman's Port causing the computer to block all idle lines after a conference is established.

2. A system as claimed in claim 1 in which another predetermined reply sequence of tones causes the computer to activate the tone transmitter/receiver to give a single beep for each busy line whereby a check may be made of the number of conference participants.

3. A system as claimed in claim 2 in which a further predetermined reply sequence of tones causes the computer to release the relay means in the interface circuit whereby all callers are disconnected from the bridge system.

4. A system as claimed in claim 3 comprising a further conference bridge circuit and a further line interface circuit, the line interface circuits being interconnected, the bridge circuits being interconnected, the line interface circuits and bridge circuits being connected to the tone transmitter/receiver, the line interface circuits being connected to the computer, and said further line interface circuit being connected to said further bridge circuit.

* * * * *